(12) United States Patent
Sun

(10) Patent No.: US 10,352,212 B2
(45) Date of Patent: Jul. 16, 2019

(54) EXHAUST GAS TREATMENT SYSTEMS AND METHODS

(71) Applicant: Ford Global Technologies LLC, Dearborn, MI (US)

(72) Inventor: Daniel Sun, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 74 days.

(21) Appl. No.: 15/791,027

(22) Filed: Oct. 23, 2017

(65) Prior Publication Data

US 2018/0128138 A1    May 10, 2018

(30) Foreign Application Priority Data

Nov. 8, 2016 (CN) .......................... 2016 1 0980415

(51) Int. Cl.
*F01N 3/01* (2006.01)
*F01N 3/027* (2006.01)
(Continued)

(52) U.S. Cl.
CPC ........... *F01N 3/0275* (2013.01); *B01D 53/32* (2013.01); *B01D 53/92* (2013.01); *B01D 53/927* (2013.01); *F01N 3/01* (2013.01); *F02M 26/05* (2016.02); *F02M 26/23* (2016.02); *F02M 26/35* (2016.02); *F02M 26/50* (2016.02); *B01D 2258/012* (2013.01); *F01N 2240/04* (2013.01); *Y02T 10/20* (2013.01)

(58) Field of Classification Search
CPC ........ F01N 3/01; F01N 3/0275; F01N 3/0892; F01N 5/04; F01N 2240/04; F01N 2240/28; B01D 53/323; B01D 2259/818; B03C 2201/30
See application file for complete search history.

(56) References Cited

U.S. PATENT DOCUMENTS 5,970,706 A   10/1999   Williamson et al.
6,474,060 B2  11/2002   Khair
(Continued)

FOREIGN PATENT DOCUMENTS

CN    105727676 A    7/2016

OTHER PUBLICATIONS

Diesel Particulate Matter and NOx Removals Using a Pulsed Corona Surface Discharge; S. Yao et al; Mar. 3, 2004; http://onlinelibrary.wiley.com/doi/10.1002/aic.10066/abstract.

*Primary Examiner* — Jonathan R Matthias
(74) *Attorney, Agent, or Firm* — Julia Voutyras; Kolitch Romano LLP

(57) ABSTRACT

A system, device and a method for gas treatment is provided. The gas treatment system comprises a generator, one or more corona devices and separation device disposed in sequence along an exhaust gas flow direction. The generator is driven by a gas flow to generate an alternating supplying voltage. The corona devices are electrically connected to the generator to provide the supplying voltage and generate a first electric field via corona discharge by the supplying voltage such that particulates in the gas passing the first electric field are charged. The separation device is electrically connected to the generator and generate a second electric filed via the supplying voltage to separate charged particulates from the exhaust gas flow.

20 Claims, 3 Drawing Sheets

(51) Int. Cl.
*F02M 26/05* (2016.01)
*F02M 26/23* (2016.01)
*F02M 26/35* (2016.01)
*F02M 26/50* (2016.01)
*B01D 53/32* (2006.01)
*B01D 53/92* (2006.01)

(56) References Cited

U.S. PATENT DOCUMENTS

| | | | |
|---|---|---|---|
| 8,966,881 B2 | 3/2015 | Nagasawa | |
| 2003/0209007 A1* | 11/2003 | Furman | F01N 3/023 60/275 |
| 2010/0072055 A1* | 3/2010 | Tanaka | B01D 53/32 204/164 |
| 2011/0283886 A1 | 11/2011 | Ladha et al. | |

* cited by examiner

EXHAUST GAS TREATMENT SYSTEMS AND METHODS

RELATED APPLICATION

This application claims the benefit of Chinese Patent Application No.: CN 201610980415.9 filed on Nov. 8, 2016, the entire contents thereof being incorporated herein by reference.

FIELD

The present application relates exhaust treatment systems and methods to remove particulates in an exhaust gas of a vehicle.

BACKGROUND

As the number of the vehicles increases, the air quality standard regulating the air pollutants discharged from the vehicle exhaust becomes more stringent. Particulate matter in the exhaust of vehicles is one of the major pollutants. In the conventional particulate filter devices for a diesel engine and a gasoline engine, a filtering mesh is positioned in an exhaust gas. A back pressure is created due to the resistance from the filtering mesh during discharge of the exhaust. The back pressure in an exhaust system of the diesel engine and the gasoline engine may reach 20 kpa-30 kpa, which can result in decreased combustion efficiency and decreased engine power. In another conventional electrical particulate removing device or an electrostatic precipitator, a high voltage of about 13 kv is needed to achieve the objective to remove the particulates carrying electrons. However, it can be difficult to connect an electrical wiring to a side of the electrical particulate removing device to add a transformer to generate the high voltage. Further, it is not practical to use a large industrial equipment in an exhaust treatment system of a vehicle. Thus, there is a need for an electrical particulate removing device with a simple and module structure.

SUMMARY

According to one aspect of the present disclosure, an exhaust gas treatment system is provided. The exhaust gas treatment system comprises a generator driven by an exhaust gas flow to generate an alternating current to provide a supplying voltage; one or more corona devices electrically connected to the generator and configured to generate a first electric field via corona discharge by the supplying voltage and a separation device electrically connected to the generator and configured generate a second electric filed via the supplying voltage. The generator, the corona devices and the separation device are disposed in sequence along a flowing direction of the exhaust gas flow. The particulates in the exhaust gas are charged when passing the first electric field in the corona device, and charged particulates from the exhaust gas flow are separated from the exhaust gas flow in the separation device.

In one embodiment, the exhaust gas treatment system further comprises a switch device electrically connected to the generator and the corona devices, and the switch device is configured to control the corona device to generate corona in pulse via the supplying voltage. A frequency of a corona discharge is the same as a frequency of the supplying voltage.

In another embodiment, the corona devices may include a first corona device and a second corona device; the switch device may include a first switch and second switch to control the first corona device and the second corona device to generate corona in pulse, respectively. The first and second corona devices generate the corona alternatingly.

In another embodiment, the exhaust gas treatment system further comprises one or more first transformers electrically connected to the generator and the corona devices. One or more first transformers are configured to convert the supplying voltage to a first voltage of the one or more corona devices. The first voltage is greater than the supplying voltage. The number of the one or more first transformers is the same as a number of the one or more corona devices.

In another embodiment, the exhaust gas treatment system further comprises a second transformer electrically connected to the generator and the separation device. The second transformer is configured to convert the supplying voltage to a second voltage applied to the separation device, and the second voltage is greater than the supplying voltage.

In another embodiment, the exhaust gas treatment system further comprises a rectifier electrically connected to the second transformer and the separation device to rectify the second voltage.

In another embodiment, the exhaust gas treatment system further comprises a direct current power supply device connected to the separation device in parallel and configured to provide an initial voltage to the separation device.

According to another aspect, an exhaust gas treatment system in a vehicle is provided. The exhaust gas treatment system comprises a housing including an inlet to receive an exhaust gas flow and an outlet to discharge the exhaust gas flow; a generator disposed adjacent to the inlet and driven by the exhaust gas flow to generate an alternating current to provide a supplying voltage; a first corona device disposed in the housing to generate a first electric field by corona discharge via the supplying voltage; and a separation device disposed inside the housing and downstream of the first corona device to generate a second electric field via the supplying voltage. When the exhaust gas flows through the corona device and the separation device, the particulates in the exhaust gas are charged in the first electric field and are guided in the second electrical field to be removed from the exhaust gas flow.

In one embodiment, the first corona device generates corona in pulse, and a frequency of corona discharge is the same as that of the supplying voltage.

In another embodiment, the exhaust gas treatment system further comprises a second corona device. The first and second corona devices generate corona discharge alternatingly according to the supplying voltage, and frequencies of the first and second corona devices are the same as that of the supplying voltage.

In another embodiment, the generator includes an electric generation module disposed outside the housing and a rotor disposed inside the housing. The rotor is rotated by the exhaust gas flow to drives the electric generation module to generate the supplying voltage.

In another embodiment, the exhaust gas treatment system further comprises a flow guide member. The flow guide member is disposed adjacent to the inlet of the housing and in a path of the exhaust gas flow and configured to vary an opening of a flow path according to a velocity of the exhaust gas flow.

In another embodiment, the flow deflector includes a flap pivotally connected to an inner wall of the inlet.

In another embodiment, the first corona device includes two corona electrodes opposing each other and disposed in a direction perpendicular to an exhaust gas flow direction, and the corona electrodes are bar shaped.

In another embodiment, the exhaust gas treatment system further comprises a capture device disposed in the housing, and charged particulates are guided in the second electric field and captured in the capture device.

In another embodiment, the capture device is made from porous porcelain.

According to yet another embodiment of the present disclosure, an exhaust gas treatment method is provided. The method comprises generating an alternate current to provide a supplying voltage via a gas flow; generating a first electric field via corona discharge by the supplying voltage to cause particulates in the exhaust gas flow charged in the first electric field; and generating a second electric field via the supplying voltage such that charged particulates from the exhaust gas flow are guided toward a capture device and removed from the exhaust gas flow in the second electric field.

In one embodiment, generating the first electric field via the corona discharge includes generating the corona discharge in pulse, and a frequency of the corona discharge is the same as that of the supplying voltage.

In another embodiment, generating a second electric field via the corona discharge includes converting the supplying voltage to a second voltage greater than the supplying voltage to generate the second electric field.

In another embodiment, generating a first electric field via the corona discharge includes converting the supplying voltage to a first voltage greater than the supplying voltage to generate the first electric field.

In another embodiment, generating the second electric field via the supplying voltage further includes rectifying the second voltage to generate the second electric field.

As the generator is driven by an exhaust gas flow to generate a supplying voltage without an outside power supply. The exhaust gas treatment system of the present disclosure is easy to be integrated in a n exhaust system of a diesel engine or a gasoline engine. In addition, the particulates are removed under electrical field which does not create resistant to an air flow. The back pressure of the exhaust gas treatment system of the present disclosure has lower back pressure compared to the conventional particulate filter device.

DESCRIPTION OF DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed systems and methods to treat exhaust gas will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various system and methods to treat exhaust gas are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
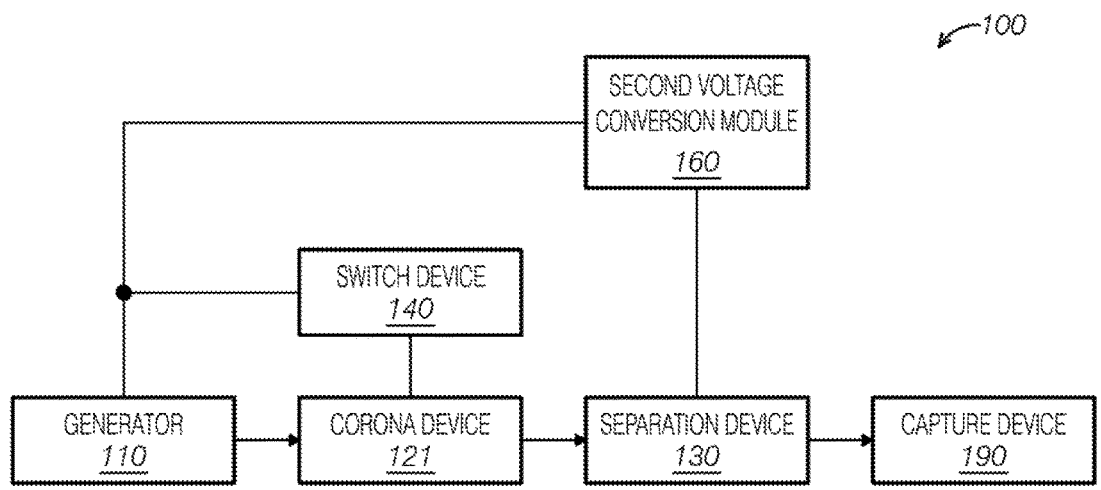
FIG. 1 is a block diagram of an exhaust gas treatment system according to one embodiment of the present disclosure.

Referring to FIG. 1, an exhaust gas treatment system 100 is provided to remove particulates in an exhaust gas flow. The exhaust gas may include exhausts from a diesel engine or a gasoline engine of a vehicle.

Figure 3:
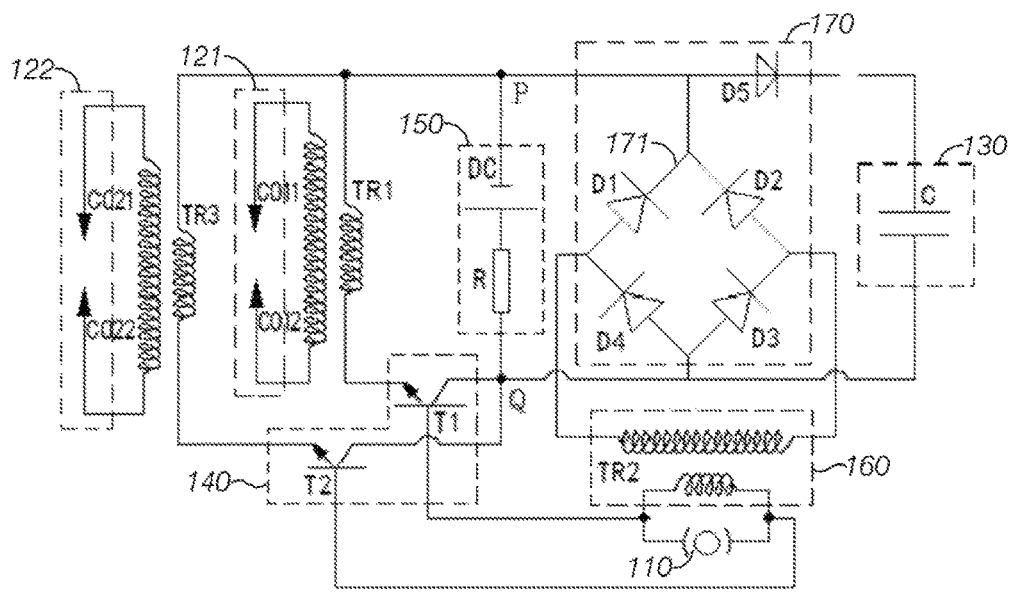
FIG. 3 is a schematic circuit diagram of an exhaust gas treatment system according to another embodiment of the present disclosure.

The exhaust gas treatment system comprises a generator 110, one or more corona devices 121 and a separation device 130, which are connected in serial. FIG. 1 illustrates an embodiment including one corona device 121. Alternatively, the gas treatment system may include two or more corona devices. As illustrated in FIG. 3, two corona devices 121, 122 may be connected in parallel. An increase in the number of corona devices can enhance an efficiency to remove particulates in the exhaust gas flow, and thus the number of corona devices can be determined according to a particulate concentration in the exhaust flow and desired particulate removal efficiency.

The generator 110 generates an alternating current to provide a supplying voltage. For example, the generator 110 may include a rotor and an alternator, which is driven by the exhaust gas flow to generate an alternating current to provide a supplying voltage. The first corona device 121 generates a first electric field by corona discharge via the supplying voltage, the separation device 130 generates a second electric field via the supplying voltage. The particulates in the exhaust gas flow is charged when flowing through the first electric field, and then the charged particulates are captured in the second electric field and then separated from the exhaust gas flow in the second electric field. The second electric field may be formed downstream of the first electric field in a flow direction. The exhaust gas treatment system can remove the particulates in the flowing gas under the effect of the first electric field and second electric field directly, which does not create a resistant to the exhaust gas flow and thus back pressure in an exhaust system is reduced comparing to a conventional particulate filter device. In addition, the supplying voltage can be adjusted based on the types of particulate since the supplying voltage needed is different for different types of particulate.

The exhaust gas treatment system 100 further includes a switch device 140 electrically connected to the generator 110 and the first corona device 121; and a second voltage conversion module 160 electrically connected to the generator 110 and the separation device 130. The second voltage conversion module 160 is configured to convert the supplying voltage to a second voltage applied to the separation device 130 and the second voltage is greater than the supplying voltage. The switch device 140 may be a switching diode or a switching transistor capable of intermittently closing and opening the switch device 140 (i.e., in pulse) via an alternating supply voltage and then providing a supply voltage to the first corona device 121 in pulse, such that the first corona device 121 generates a corona discharge in pulse. Thus, a frequency the corona discharge of the first corona device 121 is the same as a frequency of the supplying voltage. The higher the corona discharge frequency of the first corona device is, the better the particulate removal efficiency is. Therefore, the corona discharge frequency of the first corona device 121 can be configured based on the particulate concentration in the gas flow and the desired particulate removal efficiency.

Comparing with the corona discharge continually, the exhaust gas treatment system using the corona discharge in pulse needs a lower supplying voltage for corona discharge and a lower second voltage for generating the second electric field. Thus, the ratio of the transformer can be reduced, and the volume of the voltage conversion module 160 in the exhaust gas treatment system can be reduced.

Figure 2:
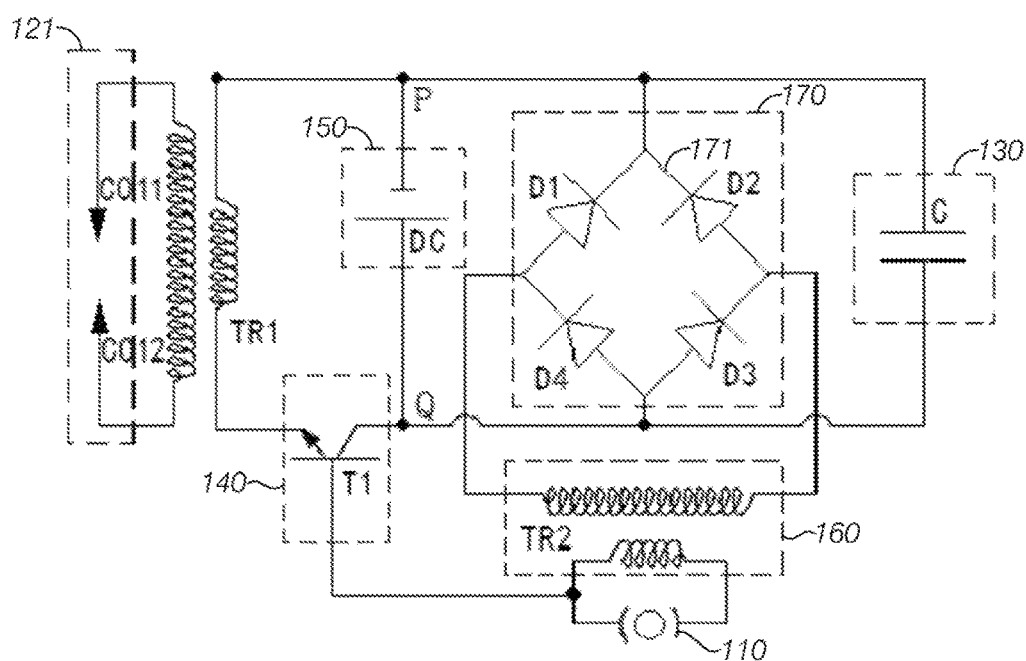
FIG. 2 is a schematic circuit diagram of an exhaust gas treatment system according to one embodiment of the present disclosure.

FIG. 2 is a circuit diagram of the exhaust gas treatment system according to one embodiment of the present disclosure. The circuit comprises a generator 110; a first corona device 121 electrically connected to the generator 110; a separation device 130 electrically connected to the generator 110; a switch device 140 electrically connected to the generator 110 and the first corona device 121; a second voltage conversion module 160 electrically connected to the switch device 140 and the first corona device 121; a rectifier 170 electrically connected to the second voltage conversion module 160 and separation device 130; and a direct current power supply device 150 parallelly connected with the separation device 130. The first transformer TR1 is configured to convert the supplying voltage to a first voltage used for the first corona device 121. The first voltage is greater than the supplying voltage. The rectifier 170 rectifies the second voltage.

The direct current power supply device 150 may include a direct current power supply DC. The separation device 130 may include a capacitor C. The switch device 140 may include a first diode T1. The second voltage conversion module 160 may include a second transformer TR2. The rectifier 170 may include four rectifier diodes D1, D2, D3, and D4 connected in series to form a bridge rectifier module 171. The first voltage conversion module includes a first transformer TR1. One end of the capacitor C and a negative electrode of the direct current power DC are electrically connected on a first point P, and another end of the capacitor C and a positive electrode of the direct current DC are electrically connected on a second point Q. A base of the first transistor T1 is electrically connected to a first output of the generator 110, an emitter of the first transistor T1 is electrically connected to a first input of the first transformer TR1, and a collector of the first transistor T1 is electrically connected to the second joint point Q. A second input the first transformer TR1 is electrically connected to the first joint point P. Two inputs of the first corona device 121 are electrically connected to the two outputs of the first transformer TR1. The first input of the second transformer TR2 is electrically connected to a first output of the generator 110. A second input of the second transformer TR2 is electrically connected to a second output of the generator 110. The first output and the second output of the second transformer TR2 are electrically connected to a first input and a second input of the bridge rectifier module 171 respectively. A first output of the rectifier module 171 is electrically connected to the first joint P, and a second output of the rectifier module 171 is electrically connected to the second joint Q.

Below is a description of a circuit operation illustrated in FIG. 2. First, an alternating voltage is generated via the generator 110 which is driven by the exhaust gas flow. The second transformer TR2 converts the supplying voltage to the second voltage that is greater than the supplying voltage. The second voltage is transferred to the capacitor C after being rectified by the bridge rectifier module 171 formed with four rectifier diodes D1, D2, D3, D4 in series. The capacitor C generates a second electric field via the second voltage. On other hands, as the supplying voltage is an alternating voltage, the supplying voltage controls the first transistor T1 to turn on or off in pulse. While the transistor T1 is switched on, the supplying voltage is transferred to the first transformer TR1. The first transformer TR1 converts the supplying voltage to the first voltage that is greater than the supplying voltage, and transfers the first voltage to the first corona device 121. Two corona electrodes CO11 and CO12 of the first corona device are connected to two outputs of the first transformer TR1, respectively. A corona discharge is created between the two corona electrodes CO11 and CO12 of the first corona device 121 to generate a first electric field under the first voltage.

Referring to FIG. 3, a circuit diagram of an exhaust gas treatment system according to another embodiment of the present disclosure is illustrated. For the sake of clarity, the features different from the embodiment in FIG. 2 are described in detail. The corona device includes a first corona device 121, and a second corona device 122. The switch device 140 includes a first transistor T1, and a second transistor T2. The direct current power supplying device 150 includes a resistor R. The rectifier 170 includes a fifth rectifier diode D5. The first voltage conversion module includes a third transformer TR3.

A base of the second transistor T2 is electrically connected to a second output of the generator 110, an emitter of the second diode T2 is electrically connected to a first input of a third transformer TR3, and a collector of the second diode T2 is electrically connected to the second connection point Q. A second input of the third transformer TR3 is electrically connected to the first connection point P. Two inputs of the second corona device 122 are electrically connected to two outputs of the third transformer TR3, respectively. The resistor R is connected to a positive electrode of the direct current power supplying device DC and the second connection point P. A positive electrode of the rectifier diode D5 is electrically connected to the first connection point P, and a negative electrode of the rectifier D5 is electrically connected to one end of the capacitor C.

Because the base of the first transistor T1 and the base of the second transistor T2 are electrically connected to two outputs of the generator 110 respectively, the polarity of voltage at the bases of the first transistor T1 and the second transistor T2 are opposite at this moment and thus it is possible to control the "on" or "off" of the first transistor T1 and the second transistor T2 via the supplying voltage in an alternating manner. The first corona device 121 and the second corona device 122 corona perform corona discharge in pulse or intermittently, and the first corona device 121 and the second corona device 122 perform corona discharge in an alternating manner. When the second transistor T2 is turned on, the supplying voltage is transferred to the third transformer TR3. The third transformer TR3 converts the supplying voltage to first voltage that is greater than the supplying voltage, and transfers the first voltage to the second corona device 122. Two electrodes CO21 and CO22 of the second corona device 122 are connected to the two outputs of the third transformer TR3, respectively. Thus, a corona discharge is generated between the two corona electrodes CO21 and CO22 of the second corona device 122 to create a first electric field under the first voltage.

Figure 4:
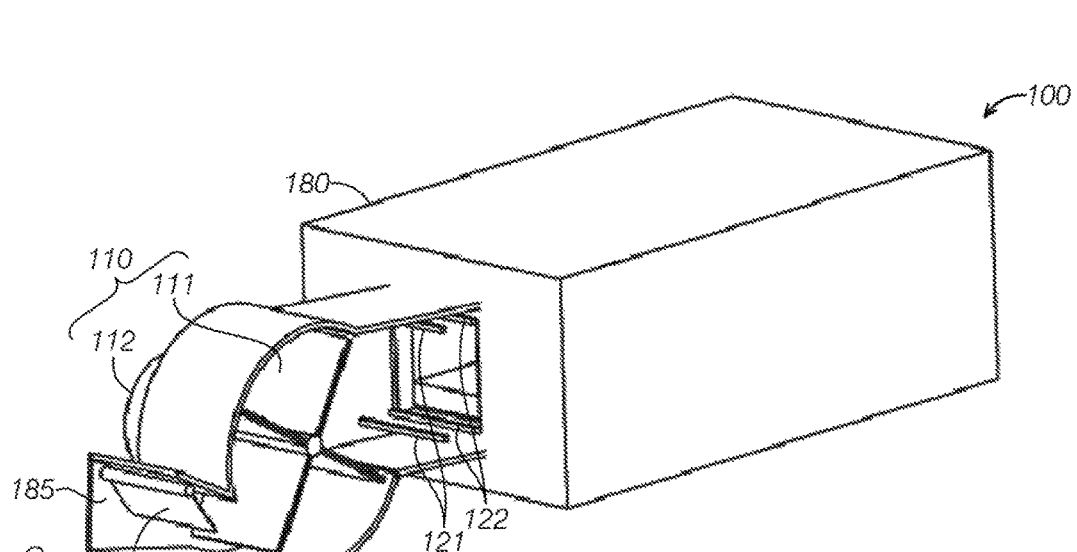
FIG. 4 is a schematic diagram of an exhaust treatment system according to one embodiment of the present disclosure.
Figure 5:
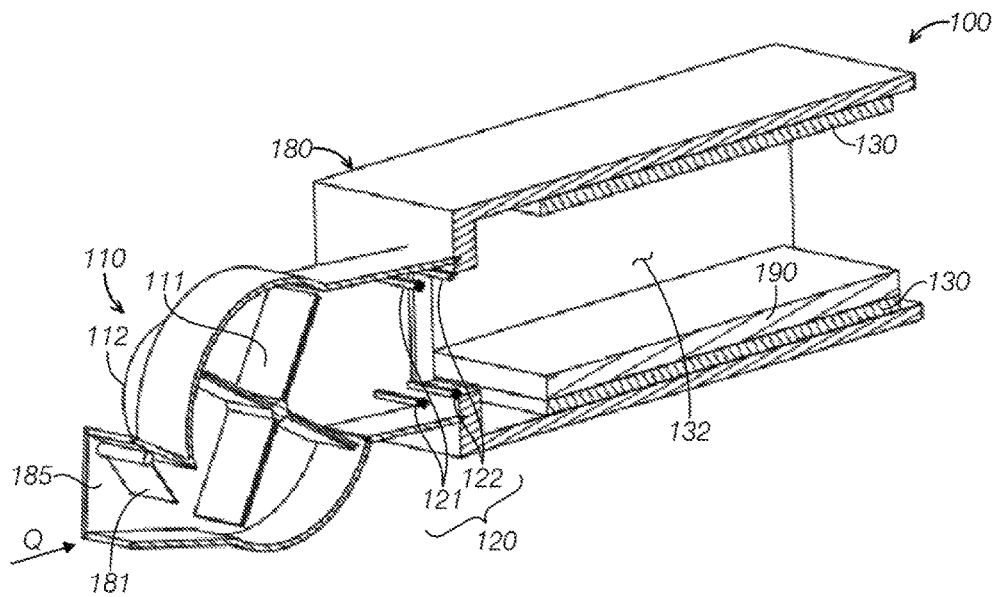
FIG. 5 is a cross-sectional view of the exhaust gas treatment system in FIG. 4.

Referring to FIGS. 4 and 5, a schematic diagram of an exhaust gas treatment system 100 according to another aspect of the present disclosure is illustrated. The gas treatment system 100 comprises a housing 180, a generator 110, corona device 120, a separation device 130 and a capture device 190. The generator 110 is driven by an exhaust gas flow to generate an alternating current to provide an alternating supply voltage. In the depicted embodiment, the corona device 120 includes a first corona device 121 and a second corona device 122 and the first and second corona devices 121 and 122 are disposed in the housing 180. It should be appreciated that the exhaust gas treatment system 100 may include one corona device or more than two corona devices. The corona devices 121, 122 generate corona discharges to create a first electric field via the supplying voltage. When the exhaust gas flows through the first electric field, the particulates in the exhaust gas are charged and separated from the exhaust gas flow in the separation device 130. The separation device 130 is disposed in the housing 180 and generates a second electric field 132 via the supplying voltage and is configured to separate charged particulates from the exhaust gas flow. The generator 110 is driven by the gas flow to generate a supplying voltage and thus an external driving device is not needed which make it easy to integrate the exhaust gas treatment system into an exhaust system of a diesel engine or a gasoline engine.

Referring to FIG. 5 the separation device 130 may include a capacitor consisting of an upper electrode plate and a lower electrode plates opposing each other. The second electric field 132 is formed in a region between the upper and lower electrode plates of the separation device 130. The second electric field is formed by the separation device 130 and thus the second electric field is easily maintained. Further, the second electric field formed on the upper and lower electrode plates of the separation device 130 can be configured to be longer and wider. In the depicted embodiment, a portion of the housing 180 containing the corona devices 121 and 122 has a cross-section area less than a cross section area of a portion of the housing containing the separation device 130. The cross-section area is at the cross-section perpendicular to an exhaust gas flow Q. That is, the separation device 130 can be sized to have a larger volume to reduce a velocity of the gas flow passing through the second electric field and thus increase the retention time of the gas flow in the separation device 130 to have more charged particulates captured.

Referring to FIGS. 4 and 5, the generator 110 includes a generation module 112 and a rotor 111. The generation module 112 may be disposed outside the housing 180 and the rotor 111 may be disposed inside the housing 180. The generation module 112 may be an alternator. The rotor 111 includes a plurality of vanes. The exhaust gas flows into the housing from an inlet 185 of the housing 180, pushes the vanes of the rotor 111 to rotate the rotor 111. The rotation of the rotor 111 drives the generation module 112 to generate an alternating current to provide the supplying voltage.

According to an embodiment of the present disclosure, the exhaust gas treatment system 100 further includes a flow guide member 181. The flow guide member 181 may be disposed inside a path that the exhaust gas flows to the rotor 111 or in the inlet 185 of the exhaust gas treatment system 100. The flow guide member 181 may be configured to vary an opening of a flow path based on a flow rate. In the depicted embodiment, the flow guide member 181 is a flap pivotally connected to an inner wall of the inlet. The flow guide member 181 pivots to different angles relative to the inner wall of the inlet 185 at different exhaust flow rates. Under a low flow velocity, the opening of the flow path can be varied to ensure a sufficient energy to rotate the rotor 111.

Referring to FIGS. 1, 4, and 5, the capture device 190 may be disposed in the housing 180 and inside the second electric field formed by the separation device 130. The charged particulates are guided in the second electric field and captured in the capture device 190. As shown in FIG. 5, the capture device 190 covers the lower electrode plate of the separation device 130 to guide the charged particulates to the capture device 190 under the second electric field. Referring to FIGS. 4 and 5, the arrow shows gas flowing direction Q. The generator 112, the corona devices 121, 122, the separation device 130, and capture device 190 are disposed in the housing 180 sequentially in the path of the gas flow. In this way, the gas treatment system can be modularized and simplified.

In some embodiments, the capture device 190 is made from porous porcelain. Alternatively, the capture device 190 may be made from other materials suitable for collecting particulates.

According to an embodiment of the invention, the corona device generates corona discharge charge intermittently, and the frequency of the corona discharge is the same as the frequency of the supplying voltage. The frequency of the supplying voltage may be determined by a rotation speed of the rotor. When the exhaust gas flows at a high speed, more particulates are present and a high gas flowrate drives the rotor at a high speed accordingly to increase the frequency of the supplying voltage, and thus results in an increase on the frequency of the corona discharge from the corona device. In this way, more particulates can be removed from the exhaust gas flow.

According to an embodiment of the present disclosure, the corona device includes a first corona device 121 and a second corona device 122. The first corona device 121 and second corona device 122 generate corona discharge in alternating manner according to the supplying voltage, and the corona discharge frequencies of the first corona device 121 and second corona device 122 are the same as that of the supplying voltage.

According to an embodiment of the present disclosure, each of the first corona device 121 and second corona device 122 includes two corona electrodes opposing each other and disposed in a direction perpendicular to a flow direction. The corona electrodes may be bar shaped. Alternatively, the corona electrode may have a center spine spike shape or may be a mesh electrode. The corona electrode generates corona discharge, and a first electric field formed between the two opposite corona electrodes may include a region of the gas flow region, and thus the particulates in the gas flow are charged in the first electric field.

Figure 6:
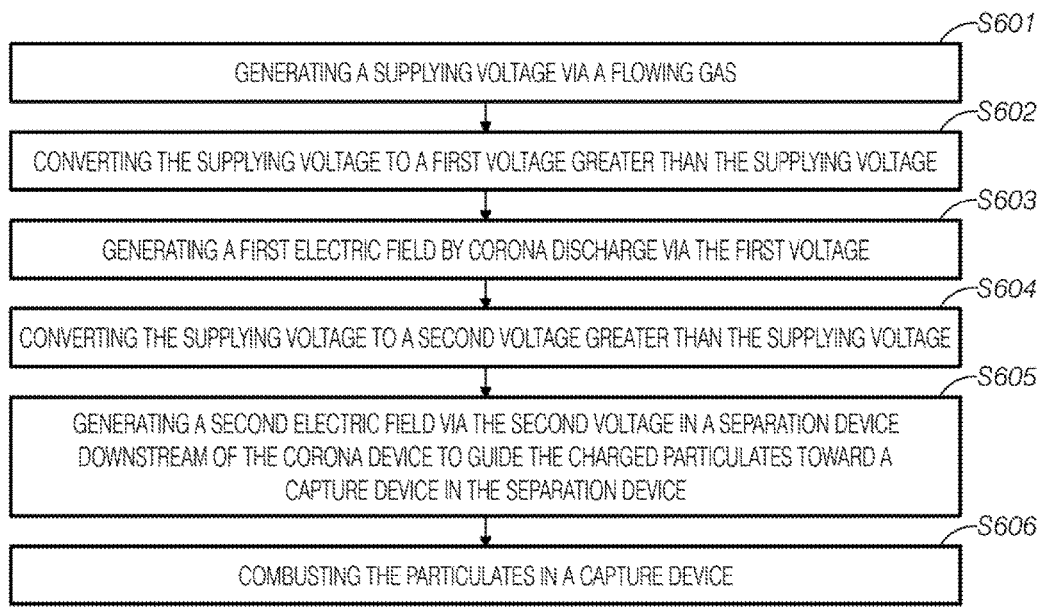
FIG. 6 is a flow chart of an exhaust gas treatment method according to one embodiment of the present disclosure.

Referring to FIG. 6, an exhaust gas treatment method 600 is provided according to another aspect of the present disclosure. The gas treatment method 600 comprises generating a supplying voltage via a flowing gas at S601. The supplying voltage may be generated by a generator 110 disposed adjacent to an inlet of an exhaust gas treatment system and driven by the exhaust gas flow. In some embodiments, the method 600 may further include converting the supplying voltage to a first voltage greater than the supplying voltage at S602. A voltage conversion module or a transformer may be used to convert the voltage. At S603, the method 600 includes generating a first electric field by corona discharge via the first voltage. The corona devices such as corona devices 121, 122 described above may be disposed downstream of the generator 110 and the first electric field is formed between a region of two electrode plates of the corona devices and the exhaust gas passed the first electric field. When the exhaust gas passes the region, the particulates in the gas flow are charged. The corona is generated in pulse, and the frequency of generating corona discharge is the same as the frequency of the supplying voltage. At S604, the method 600 may further include converting the supplying voltage to a second voltage greater than the supplying voltage. In some embodiments, the second voltage may be further rectified to generate the second electric field.

At S605, the method 600 may include generating a second electric field via the second voltage in a separation device downstream of the corona device. When the they pass the second electric field in the separation device, the charged particulates are guided toward a capture device in the separation device and captured to be separated from the gas flow.

In some embodiments, the method 600 may further include combusting the particulates at S606 in the capture device such that the exhaust gas treatment system or a separation device is regenerated.

The systems and methods the present disclosure generate a supplying voltage by a voltage generation module via a flowing gas. As no external driving force is needed, it is easy to integrate the gas treatment system in an exhaust system of a diesel engine and a gasoline engine. Further, there is no resistant to the gas flow as only the electric field is applied to the particulates. Thus, a back pressure is reduced compared to a conventional particulate filter.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. An exhaust gas treatment system, comprising:
a housing;
a generator, wherein the generator is driven by an exhaust gas flow to generate an alternating current to provide a supplying voltage;
one or more corona devices disposed in the housing, wherein the corona devices are electrically connected to the generator and generate a first electric field by the supplying voltage such that particulates in the exhaust gas passing the first electric field are charged; and
a separation device disposed in the housing, wherein the separation device is electrically connected to the generator and generates a second electric field via the supplying voltage such that charged particulates in the exhaust gas flow are separated from the exhaust gas flow,
wherein the generator, the corona devices and the separation device are connected in sequence along an exhaust gas flow direction, and
wherein a portion of the housing containing the corona devices have a cross-section area less than a cross-section area of a portion of the housing containing the separation device, and wherein the cross-section areas of the housing are at cross sections perpendicular to an exhaust gas flow direction.

2. The exhaust gas treatment system of claim 1, further comprising a switch device electrically connected to the generator and the corona devices, and wherein the switch device is configured to control the corona device to generate corona in pulse via the supplying voltage, and wherein a frequency of a corona discharge is the same as a frequency of the supplying voltage.

3. The exhaust gas treatment system of claim 2, wherein the corona devices include a first corona device and a second corona device; wherein the switch device includes a first switch and a second switch to control the first corona device and the second corona device to generate corona in pulse, respectively, and wherein the first and second corona devices generate the corona alternatingly.

4. The exhaust gas treatment system of claim 1, further comprising one or more first transformers electrically connected to the generator and the corona devices, wherein the one or more first transformers are configured to convert the supplying voltage to a first voltage of the one or more corona devices, and wherein the first voltage is greater than the supplying voltage; and wherein a number of the one or more first transformers is the same as a number of the one or more corona devices.

5. The exhaust gas treatment system of claim 4, further comprising a second transformer electrically connected to the generator and the separation device, wherein the second transformer is configured to convert the supplying voltage to a second voltage applied to the separation device, and wherein the second voltage is greater than the supplying voltage.

6. The exhaust gas treatment system of claim 5, further comprising a rectifier electrically connected to the second transformer and the separation device to rectify the second voltage.

7. The exhaust gas treatment system of claim 5, further comprising a direct current power supply device connected to the separation device in parallel and configured to provide an initial voltage to the separation device.

8. An exhaust gas treatment system in a vehicle, comprising:
a housing including an inlet to receive an exhaust gas flow and an outlet to discharge the exhaust gas flow;
a generator disposed adjacent to the inlet, wherein the generator is driven by the exhaust gas flow to generate an alternating current to provide a supplying voltage;
a first corona device disposed in the housing, wherein the corona device generates a first electric field by corona discharge via the supplying voltage, and wherein the first electric field causes particulates in the exhaust flow charged; and
a separation device disposed inside the housing and downstream of the first corona device, wherein the separation device generates a second electric field via the supplying voltage and is configured to separate charged particulates from the exhaust gas flow,
wherein a portion of the housing containing the first corona device has a cross-section area less than a cross-section area of a portion of the housing containing the separation device, and wherein the cross-section areas of the housing are at cross sections perpendicular to an exhaust gas flow direction.

9. The exhaust gas treatment system of claim 8, wherein the first corona device generates corona in pulse, and a frequency of corona discharge is the same as that of the supplying voltage.

10. The exhaust gas treatment system of claim 8, further comprising a second corona device disposed in the housing, wherein the first and second corona devices generate corona discharge alternatingly according to the supplying voltage, and wherein frequencies of the first and second corona devices are the same as that of the supplying voltage.

11. The exhaust gas treatment system of claim 8, wherein the generator includes an electric generation module disposed outside the housing and a rotor disposed inside the housing, and wherein the rotor is rotated by the exhaust gas flow to drive the electric generation module to generate the supplying voltage.

12. The exhaust gas treatment system of claim 11, further comprising a flow guide member, wherein the flow guide member is disposed adjacent to the inlet of the housing and in a path of the exhaust gas flow and configured to vary an opening of a flow path according to a velocity of the exhaust gas flow.

13. The exhaust gas treatment system of claim 12, wherein the flow guide member includes a flap pivotally connected to an inner wall of the inlet.

14. The exhaust gas treatment system of claim 8, wherein the first corona device includes two corona electrodes opposing each other and disposed in a direction perpendicular to the exhaust gas flow direction, and wherein the corona electrodes are bar shaped.

15. The exhaust gas treatment system of claim 8, further comprising a capture device disposed in the housing, wherein charged particulates are separated from the exhaust gas flow in the second electric field and captured in the capture device.

16. An exhaust gas treatment method in a vehicle, comprising:
generating an alternate current to provide a supplying voltage by a generator via an exhaust gas flow;
generating a first electric field via corona discharge by the supplying voltage in a corona device such that particulates in the exhaust gas flow are charged in the first electric field, wherein the corona device is disposed in a housing; and
generating a second electric field the supplying voltage in a separation device disposed in the housing and downstream of the corona device such that charged particulates from the exhaust gas flow are separated from the exhaust gas flow in the second electric field,
wherein a portion of the housing containing the corona device has a cross-section area less than a cross-section area of a portion of the housing containing the separation device, and wherein the cross-section areas of the housing are at cross sections perpendicular to an exhaust gas flow direction.

17. The exhaust gas treatment method of claim 16, wherein generating the first electric field via the corona discharge includes generating the corona discharge in pulse, and wherein a frequency of the corona discharge is the same as that of the supplying voltage.

18. The exhaust gas treatment method of claim 16, wherein generating a second electric field via the corona discharge includes converting the supplying voltage to a second voltage greater than the supplying voltage to generate the second electric field.

19. The exhaust gas treatment method of claim 16, wherein generating a first electric field via the corona discharge includes converting the supplying voltage to a first voltage greater than the supplying voltage to generate the first electric field.

20. The exhaust gas treatment method of claim 18, wherein generating the second electric field via the supplying voltage further includes rectifying the second voltage to generate the second electric field.

* * * * *